US004001738B2

United States Statutory Invention Registration [19]

[11] Reg. Number: H1738

[45] Published: Jul. 7, 1998

Reinhart, Jr.

[54] TEAR RESISTANT DISPOSABLE BIB

[75] Inventor: Richard Nicholas Reinhart, Jr., Cincinnati, Ohio

[73] Assignee: The Procter & Gamble Company, Cincinnati, Ohio

[21] Appl. No.: 369,210

[22] Filed: Jan. 5, 1995

[51] Int. Cl.[6] ..... A41B 13/00

[52] U.S. Cl. ..... 2/49.1

[58] Field of Search ..... 2/46, 48, 49.1, 2/49.2, 49.3, 49.4, 49.5, 50, 51, 52, 243.1, 69, 69.5, 75, 80, 83

[56] References Cited

U.S. PATENT DOCUMENTS

| | | | |
|---|---|---|---|
| 3,286,279 | 11/1966 | Brown | 2/19 |
| 3,329,969 | 7/1967 | Farber et al. | 2/49 |
| 3,332,547 | 7/1967 | Rowe et al. | 206/56 |
| 3,532,800 | 10/1970 | Wyly et al. | 174/25 |
| 3,608,092 | 9/1971 | Taranto | 2/49 R |
| 3,837,995 | 9/1974 | Floden | 161/150 |
| 3,871,027 | 3/1975 | Orr | 2/49 R |
| 3,916,447 | 11/1975 | Thompson | 2/46 |
| 3,945,048 | 3/1976 | Shearer | 2/49 R |
| 3,979,776 | 9/1976 | Gruenwald | 2/49 R |
| 3,995,321 | 12/1976 | Johnson | 2/49 R |
| 3,999,221 | 12/1976 | Hannigan | 2/49 R |
| 4,136,222 | 1/1979 | Jonnes | 2/243.1 X |
| 4,186,443 | 2/1980 | Britzman | 2/49 R |
| 4,233,688 | 11/1980 | Hjerl | 2/49 R |
| 4,261,057 | 4/1981 | Andersson | 2/49 R |
| 4,416,025 | 11/1983 | Moret et al. | 2/49 R |
| 4,441,212 | 4/1984 | Ahr et al. | 2/49 R |
| 4,445,231 | 5/1984 | Noel | 2/49 R |
| 4,495,658 | 1/1985 | Moret et al. | 2/49 R |
| 4,523,333 | 6/1985 | Spangler | 2/49 R |
| 4,523,334 | 6/1985 | Lavash | 2/49 R |
| 4,569,086 | 2/1986 | Takefman | 2/49 R |
| 4,646,365 | 3/1987 | Suprise et al. | 2/49 R |
| 4,649,572 | 3/1987 | Roessler | 2/49 R |
| 4,660,226 | 4/1987 | Quilling et al. | 2/49 R |
| 4,733,411 | 3/1988 | Foti | 2/49 R |
| 4,769,024 | 9/1988 | Pike et al. | 604/390 |
| 4,779,288 | 10/1988 | Mack | 2/49 R |
| 4,787,099 | 11/1988 | Mack | 2/49 R |
| 4,797,952 | 1/1989 | Petrini | 2/49 R |
| 4,846,822 | 7/1989 | Foxman | 604/370 |
| 4,884,299 | 12/1989 | Rose | 2/49 R |
| 4,891,846 | 1/1990 | Sager et al. | 2/49 R |
| 5,074,013 | 12/1991 | Arnold et al. | 24/713 |
| 5,407,612 | 4/1995 | Gould et al. | 264/24 |
| 5,477,560 | 12/1995 | Shope | 2/49.1 |
| 5,490,289 | 2/1996 | Lehrer | 2/49.2 |

FOREIGN PATENT DOCUMENTS 1217892 12/1970 United Kingdom .

*Primary Examiner*—Charles T. Jordan
*Assistant Examiner*—Meena Chelliah
*Attorney, Agent, or Firm*—Gerry S. Gressel; Larry L. Huston; E. Kelly Linman

[57] ABSTRACT

The present invention provides a bib having a filamentary network disposed between a paper topsheet and a plastic film backsheet. The filamentary network can comprise a polymeric net having openings sized to prevent tearing of portions of the topsheet or backsheet from the bib. In one embodiment the filamentary network can comprise a nylon net having openings with a maximum width less than about 0.25 cm.

17 Claims, 2 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

TEAR RESISTANT DISPOSABLE BIB

FIELD OF THE INVENTION

The present invention is related to disposable bibs, and more particularly, to a bib that resists tearing.

BACKGROUND OF THE INVENTION

Disposable bibs are well known in the art. Such bibs can be provided for use on, for example, babies being fed. Disposable bibs can have a laminate construction comprising multiple layers. For instance, disposable bibs can include an absorbent paper topsheet for receiving spilled food material and a plastic film backsheet for preventing penetration of spilled liquids through the bib and onto the baby's clothing.

The art also discloses bibs having three layers, such as a layer of thermoplastic material between two layers of paper. Other bib designs shown in the art include bibs having a multilayer construction, including a gauze decorative layer, as well as bibs having a front panel formed from plastic film to have grooves and apertures for catching and holding food. The art also teaches that it is known to cover a paper bib with an open net or reticulated material so that the paper is held together.

The following references illustrate various bib constructions: U.S. Pat. No. 3,286,279 issued Nov. 22, 1966 to Brown; U.S. Pat. No. 3,329,969 issued Jul. 11, 1967 to Farber et al.; U.S. Pat. No. 3,608,092 issued Sep. 28, 1971 to Taranto; U.S. Pat. No. 3,979,776 issued Sep. 14, 1976 to Gruenwald; U.S. Pat. No. 4,416,025 issued Nov. 22, 1983 to Moret et al.; U.S. Pat. No. 4,441,212 issued Apr. 10, 1984 to Ahr; U.S. Pat. No. 4,445,231 issued May 1, 1984 to Noel; and U.S. Pat. No. 4,884,299 issued Dec. 5, 1989 to Rose.

One problem with known disposable bibs having a paper and plastic layer construction is that babies can tear off pieces of the bib. Tearing of the bib is undesirable because it reduces effective coverage of the baby's clothes, and also creates added pieces of waste requiring disposal.

Attempting to prevent tearing of the bib by design of the plastic film forming the waterproof backsheet, alone, is generally not satisfactory. Such plastic films generally have an inherent tradeoff of strength and flexibility. For example, stronger polymers tend to be less flexible while strength gained by increased thickness also compromises flexibility.

Alternatively, adding a protective layer to the back, garment facing surface of the bib does not provide the desired support to the paper topsheet. Adding a protective layer on the outer front surface of the bib does not provide support to the plastic backsheet, can affect the aesthetics of the outer front surface of the bib, and also can interfere with absorption of liquid spills on the outer front surface of the bib.

Accordingly, it is an object of the present invention to provide a disposable bib which resists tearing without detrimentally impairing either absorption, aesthetics, or flexibility of the bib.

Another object of the present invention is to provide a disposable bib having a multilayer construction.

Yet another object of the present invention is to provide a disposable bib having a polymeric net layer disposed between and joined to a paper topsheet layer and a plastic film backsheet layer.

Yet another object of the present invention is to provide a disposable bib having a reinforcing network having openings sized to prevent tearing of the bib while permitting absorption of liquid spills on an outer layer of the bib.

Yet another object of the present invention is to provide a disposable bib having an absorbent paper topsheet, a plastic film backsheet, and a reinforcing middle layer comprising a polymeric net, wherein the reinforcing layer has a greater tensile strength than at least one of the topsheet or the backsheet layers to carry pulling loads exerted by the wearer, and wherein the openings in the net are sized to prevent the wearer from tearing off discrete pieces of the topsheet.

SUMMARY OF THE INVENTION

The present invention provides a disposable bib having a composite construction. In one embodiment, the bib can have a absorbent, liquid permeable outer topsheet; a garment facing backsheet layer, the backsheet layer being liquid impermeable relative to the topsheet; and a load carrying filamentary network disposed intermediate the backsheet and the topsheet.

The filamentary network layer can be joined to oppositely facing surfaces of the topsheet and backsheet, and can have a plurality of openings there through, wherein the filamentary network can have an open area ratio of at least about 50 percent. The openings in the filamentary network are preferably sized to prevent a baby's finger from passing through the openings in the network, and thereby prevent the baby from tearing small pieces of the bib from the bib body.

The bib can comprise a tissue paper topsheet having a first outwardly facing surface and a second oppositely facing surface, and a polymeric net joined to the second surface of the topsheet. The polymeric net can comprise a first plurality of generally parallel filaments extending in a first direction and a second plurality of generally parallel filaments extending in a second direction angled with respect to the first direction. The maximum spacing between adjacent parallel filaments can be no more than about 2 cm, and in one embodiment is no more than about 1 cm to prevent the wearer from inserting his finger between the filaments and tearing off small pieces of the bib.

BRIEF DESCRIPTION OF THE DRAWINGS

While the specification concludes with claims particularly pointing out and distinctly claiming the present invention, the invention will be better understood from the following description taken in conjunction with the accompanying drawings in which like designations are used to designate substantially identical elements, and in which:

DETAILED DESCRIPTION OF THE INVENTION

Figure 1:
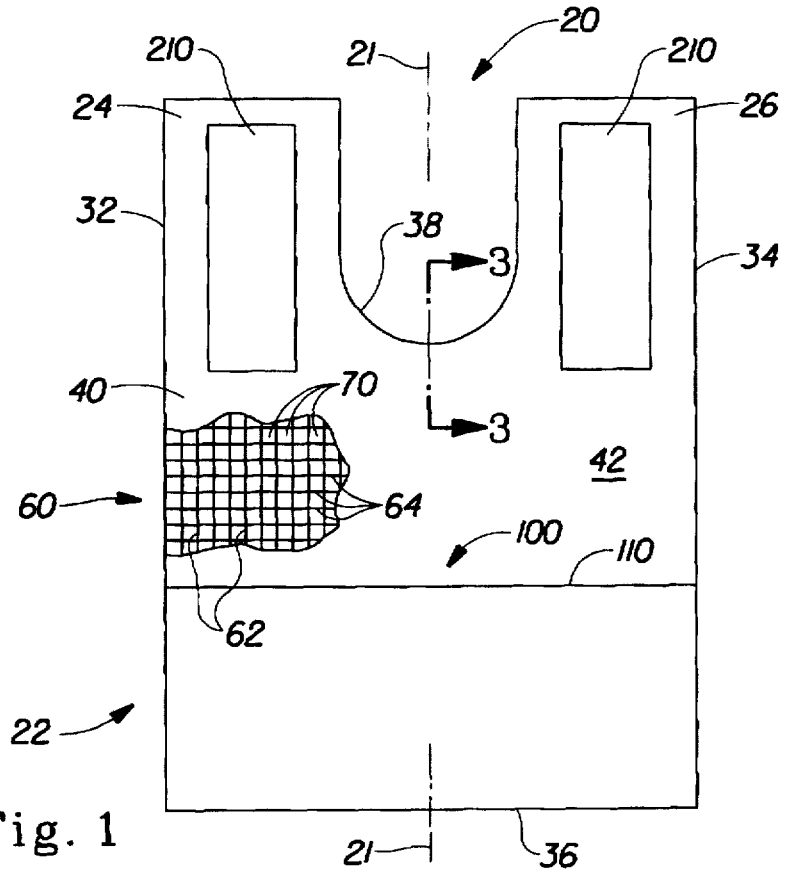
FIG. 1 is a front plan view of the disposable bib of the present invention, with a portion of the topsheet cut away to show a reinforcing filamentary network disposed between the topsheet and the backsheet, wherein the filaments of the filamentary network extend generally longitudinally and laterally.

FIGS. 1–5 illustrate a disposable bib 20 according to the present invention. The bib 20 includes a bib body 22 and a pair of shoulder extensions 24 and 26 extending from the bib body 22 on either side of a bib longitudinal centerline 21. The term "longitudinal" refers to a direction or axis which is generally parallel to a line extending from the wearer's head to the wearer's waist as the bib is worn. The term "lateral" refers to a direction or axis which is perpendicular to the longitudinal direction and which is generally parallel to a line extending across the wearer's chest as the bib is worn.

The bib 20 has a periphery which can include two generally longitudinally extending side edges 32 and 34, a generally laterally extending bottom edge 36, and a neck opening 38. The neck opening 38 is disposed intermediate the shoulder extensions 24 and 26, and accommodates the wearer's neck as the bib is worn. The neck opening 38 is a generally U-shaped opening in FIG. 1, but it will be understood that other neck opening configurations, including various open and closed shapes, could be used. The following U.S. Patents are incorporated herein by reference for purpose of showing various bib shapes: U.S. Pat. No. 4,416,025 issued Nov. 22, 1983 to Moret et al.; U.S. Pat. No. 4,441,212, Apr. 10, 1984 issued to Ahr; and U.S. Pat. No. 4,445,231 issued May 1, 1984 to Noel.

The bib 20 according to the present invention comprises a composite construction having multiple laminae. In the Figures, the bib comprises an absorbent, liquid permeable outer topsheet layer 40, a garment facing backsheet layer 80 which is liquid impermeable relative to the topsheet 40, and a load carrying filamentary network 60 disposed intermediate the backsheet layer 80 and the topsheet layer 40. The topsheet 40 has a first outer surface 42 for receiving spilled food material, and a second inner surface 44. The backsheet 80 has a first garment facing surface 82 and a second surface 84. The surface 84 of the backsheet 80 and the surface 44 of the topsheet 40 are oppositely facing surfaces. The filamentary network 60 has a plurality of openings 70 extending there through, and can be joined to oppositely facing surfaces 44 and 84 of the topsheet 40 and backsheet 80.

The filamentary network 60 can have tensile strength and tensile elongation properties which permit it to carry loads exerted on the bib 20, thereby imparting tear resistance to the bib 20. In one embodiment the filamentary network 60 comprises a polymeric net comprising a first plurality of generally parallel filaments 62 and a second plurality of generally parallel filaments 64. The filaments 62 can extend generally longitudinally, and the filaments 64 can extend generally laterally, as shown in FIG. 1. However, it will be understood that the filaments 62 and 64 need not extend longitudinally and laterally, nor be generally parallel or mutually perpendicular. For example, in the embodiment shown in FIG. 2, the filaments 62 and 64 can extend diagonally with respect to the longitudinal axis 21, and can form an angle of about 45 degrees with the axis 21.

Figure 2:
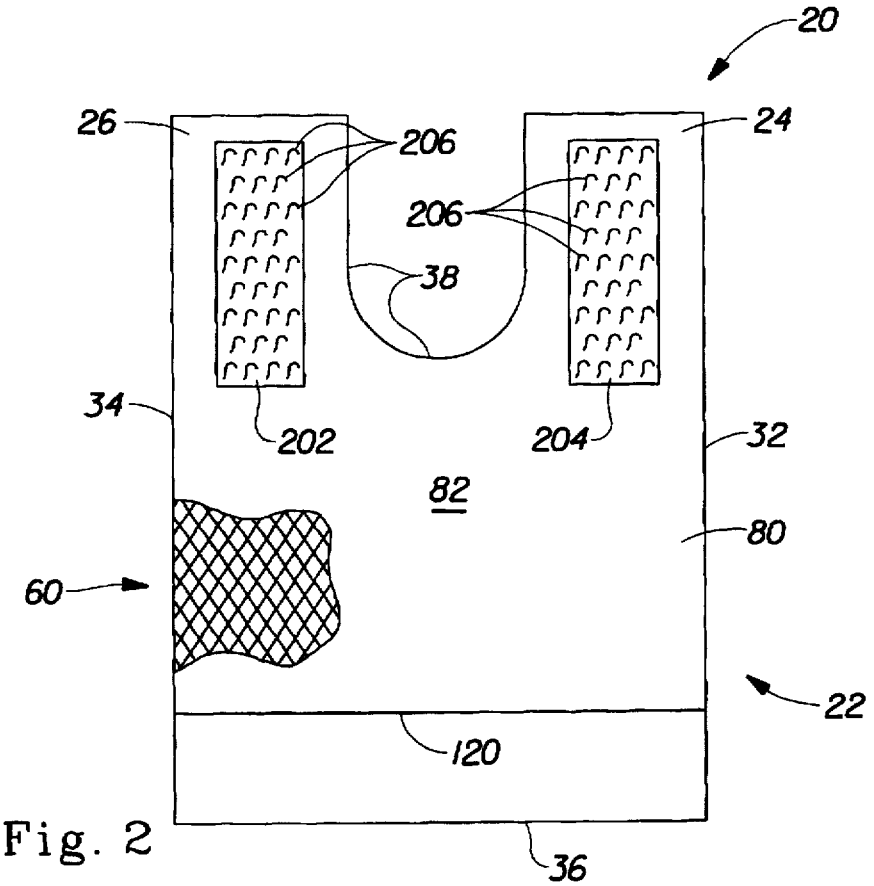
FIG. 2 is a rear plan view of a disposable bib of the present invention, with a portion of the backsheet cut away to show a reinforcing filamentary network disposed between the topsheet and the backsheet, wherein the filaments of the filamentary network extend generally diagonally with respect to the longitudinal direction.
Figure 3:
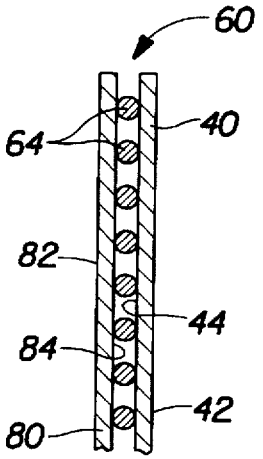
FIG. 3 is a partial cross-sectional view taken along lines 3—3 in FIG. 1, and showing the filamentary network disposed between the topsheet and the backsheet.

The disposable bib 20 can optionally have a pocket 100 for catching and receiving food particles. The pocket 100 can have an open edge 110 and a bottom edge 120 (FIG. 2). U.S. Pat. No. 4,445,231, listed above, is incorporated herein by reference for the purpose of teaching suitable constructions for pocket 100.

Figure 5:
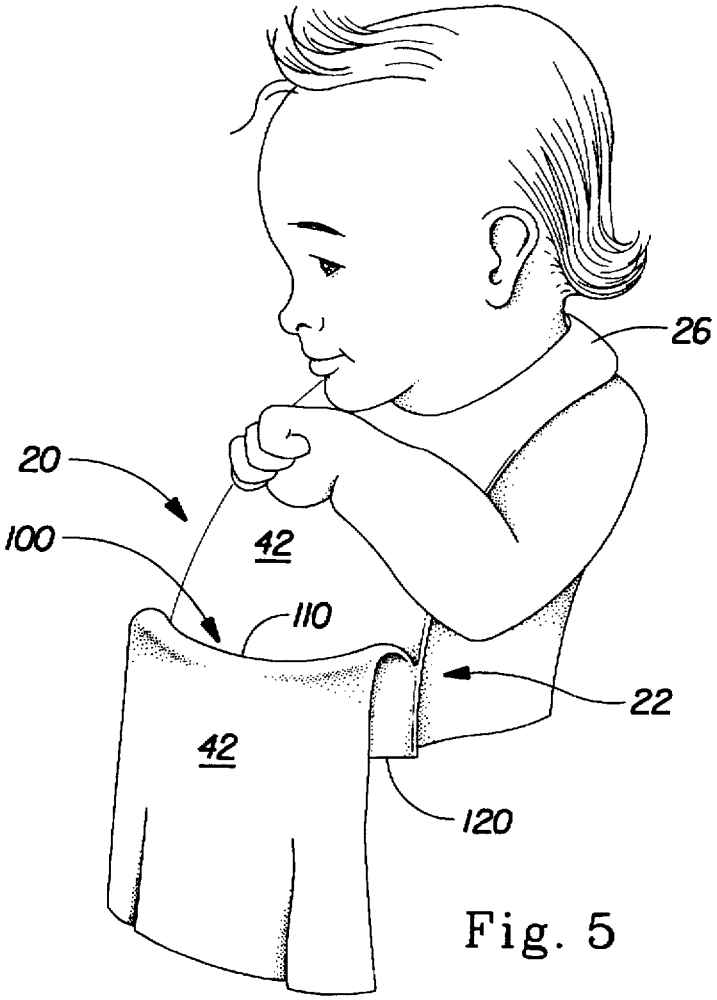
FIG. 5 is an in use perspective view of a disposable bib.

The bib 20 can also have a fastening assembly for holding the bib 20 in place on the wearer. FIG. 5 shows the bib 20 held in place on a wearer. In FIGS. 1 and 2, the fastening assembly includes fastening members 202 and 204 disposed on the garment facing surface 82 of the backsheet 80. The fastening members 202 and 204 are positioned on the shoulder extensions 24 and 26, and can comprise a plurality of fabric engaging projections 206, which can be in the shape of a prong or hook. The projections 206 extend from the plane of the bib 20. In one embodiment, the projections 206 on each of the shoulder extensions 24 and 26 can engage the fabric of the wearer's garment to hold the bib 20 in place.

In another embodiment, the bib can also include one or more landing surfaces 210 engageable by the projections 206. A landing surface 210, which can comprise a non-woven fabric, is joined to the outer surface 42 of the topsheet 40, and positioned on the shoulder extension 24. To secure the bib to the wearer, the shoulder extension 26 is positioned to overlap the shoulder extension 24 behind the wearer's neck, with the projections 206 on the fastening member 202 engaging the landing surface 210. Suitable fastening members 202 and 204 are manufactured by the 3M Company of Minnesota under the designation MC-6, Code KN0513/KN0514. A suitable landing surface 210 is a non-woven web of polypropylene fibers manufactured by the Veratec Division of the International Paper Corporation of Walpole, Mass. under the designation P-14, Supplier Grade #9324369. Suitable hook and loop type fasteners are also available from VELCRO U.S.A. of New Hampshire. Other suitable fastening members having projections are disclosed in the following U.S. Patents, which are incorporated herein by reference: U.S. Pat. Nos. 4,846,815 issued Jul. 11, 1989 to Scripps; 4,894,060 issued Jan. 16, 1990 to Nestegard; 4,946,527 issued Aug. 7, 1990 to Battrell; 5,019,065 issued May 28, 1991 to Scripps; 5,058,247 issued Oct. 22, 1991 to Thomas et al.; 5,116,563 issued May 26, 1992 to Thomas et al.; 5,180,534 issued Jan. 19, 1993 to Thomas et al.; 5,318,741 issued Jun. 7, 1994 to Thomas; 5,325,569 issued Jul. 5, 1994 to Goulait et al.; and 5,326,415 issued Jul. 5, 1994 to Thomas et al. Alternatively, ties, tape, or other adhesive fasteners can be used to secure the bib to the wearer.

Examining the laminar construction of the bib 20 in more detail, the topsheet 40 can comprise a paper web having a basis weight of from about 10 to about 50 pounds per three thousand square feet. The following U.S. Patents are incorporated by reference for the purpose of disclosing how to make tissue paper suitable for use in making a topsheet 40: U.S. Pat. Nos. 4,191,609; 4,440,597; 4,529,480; 4,637,859; 5,223,096; and 5,240,562. A suitable topsheet 40 can be formed from a single ply or multiple ply paper towel, such as a Bounty Paper Towel manufactured by The Procter and Gamble Company of Cincinnati, Ohio.

The backsheet 80 can comprise a liquid impervious film. In on embodiment the backsheet 80 can comprise a polyethylene film having a thickness of between about 0.0076 millimeter and about 0.0508 millimeter. A polyethylene film from which the backsheet 80 can be formed is manufactured by Tredegar Industries of Terre Haute, Ind.

The filamentary network 60 is joined to the surfaces 44 and 84 of the topsheet 40 and the backsheet 80 by any suitable means, including but not limited to mechanical bonding, adhesive bonding, and ultrasonic bonding. The filamentary network 60 is preferably joined to the surfaces 44 and 84 along substantially the entire longitudinal length and across substantially the entire lateral width of the bib 20. A suitable adhesive for joining the filamentary network 60 to the topsheet 40 and the backsheet 80 is a hot melt adhesive such as Findley Adhesive H2031 available from Findley Adhesives of Elmgrove, Wis. About 3 milligrams of the H2031 adhesive per square inch of bib area can be used to join the filamentary network 60 to the topsheet 40 and the backsheet 80.

The filamentary network 60 increases the tensile strength of the bib 20, to thereby provide the bib with tear resistance.

The filamentary network 60 can have a maximum tensile strength (the tensile strength measured in the direction along which the tensile strength of the filamentary network 60 is maximum) greater than that of either the of topsheet 40 or the backsheet 80. The tensile strength can be measured using a constant rate of elongation tensile test machine, as described below.

Different net materials, such as different polymeric materials, can be chosen to provide the bib with different strength, elongation, and flexibility properties. Generally, higher levels of strength result in lower levels of flexibility. The cross-sectional dimension of the filaments and the spacing between adjacent filaments can be selected depending upon the strength and flexibility of the material from which the filaments are made. For materials having a relatively high strength and a relatively low flexibility, filaments with a relatively small cross-sectional dimension can be used, and the spacing between adjacent filaments can be relatively large. For materials having a relatively low strength and a relatively high flexibility, filaments with relatively large cross-sectional dimensions can be used, and the spacing between adjacent filaments can be relatively small.

The openings 70 between adjacent filaments of the filamentary network 60 are sized to prevent infant wearers from grasping unreinforced areas of the topsheet 40 overlying the openings 70 and tearing such unreinforced areas of the topsheet 40 from the bib. The openings 70 preferably can be sized to be smaller than the fingertip of a wearer to prevent the wearer from poking a finger through the topsheet 40. Accordingly, the openings 70 can have a maximum width 74 (FIG. 4) of no more than about 2 centimeters. In one preferred embodiment, the openings 70 can have a maximum width 74 which is no more than about 1 cm, preferably no more than about 0.5 cm, and most preferably no more than about 0.25 cm.

Figure 4:
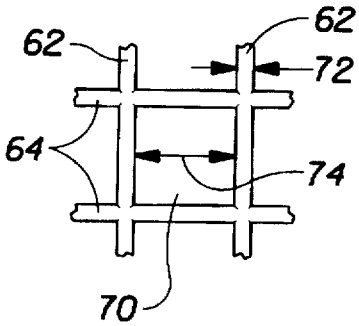
FIG. 4 is an enlarged schematic illustration of a portion of the filamentary network.

The filamentary network preferably provides tear resistance without substantially increasing the stiffness of the bib 20, without substantially affecting the ability of the topsheet 40 to absorb spilled food material, and without substantially increasing the amount of material required to construct the bib. Some materials, such as thermoplastic materials exhibit both relatively high strength and relatively high flexibility. Accordingly, for the range of width 74 listed above, the filaments can have a relatively small cross-sectional dimension 72 (FIG. 4). For instance, the cross-sectional dimension 72 can be less than about 2 mm, and in one embodiment, the cross-sectional dimension 72 can be less than about 0.25 mm, thereby providing the filamentary network 60 with a relatively large open area ratio. The open area ratio increases with increasing spacing between adjacent filaments, and the open area ratio decreases as the cross-sectional dimension 72 of the filaments increases.

The open area ratio of the filamentary network 60 is calculated by measuring the area of openings 70 in a 10 centimeter by 10 centimeter square sample of the filamentary network 60, and dividing the area of the openings 70 in the sample by the sample size (100 square centimeters). For the range of widths 74 and dimension 72 listed above, the open area ratio of the filamentary network 60 can be at least about 50 percent, and in one embodiment is at least about 75 percent.

The filamentary network 60 can comprise a net of thermoplastic material, wherein the thermoplastic material is selected from a group including polyethylene, polypropylene, polyvinyl chloride, polyvinyl acetate, nylon, polyesters, polyethylene vinyl acetate, polyethylene methyl methacrylate, polyethylene acrylic acid, polypropylene methylmethacrylate, polypropylene acrylic, acid, polyvinyliliene chloride, polyvinyl alcohol, cellulose acetate, cellulose butyrate, polycarbonates, and alkyd cellulosics, wherein the aforementioned thermoplastic polymers are considered to be illustrative but not limiting. Alternatively, the filamentary network can comprise a web made from natural fibers, synthetic fibers, or combinations thereof. Suitable natural fibers include, but are not limited to, cotton, flax, wool, and silk. Suitable synthetic cellulosic, synthetic modified cellulosic or synthetic mineral fibers include, but are not limited to, rayon, acetate, lyocell, and fiberglas.

The filamentary network 60, which is schematically illustrated in FIG. 4, can be formed by a number of suitable techniques, including but not limited to casting, molding, weaving, and knitting. Each filament 62 and 64 can comprise a single strand, or two or more strands twisted together. Essentials of Textiles, Third Edition by Marjory L. Joseph, (1984) page 237 describes net construction, and is hereby incorporated by reference.

In one embodiment the filamentary network 60 can comprise a knitted nylon net comprising the first plurality of generally parallel filaments 62 extending in a first direction and the second plurality of generally parallel filaments 64 extending in a second direction angled with respect to the first direction. Each of the filaments 62 and 64 comprises two nylon strands. The individual strands have a diameter of between about 0.02 mm and about 0.10 mm, and the filaments 62 and 64 have a maximum cross-sectional width dimension 72 of between about 0.04 mm and about 0.20 mm (about twice the diameter of the individual strands). The maximum width 74 of the openings 70 is between about 0.05 cm and about 0.20 cm. Adjacent filaments of the first plurality of generally parallel filaments 62 are spaced apart to provide between about 6 and about 14 filaments 62 per centimeter, and adjacent filaments of the second plurality of generally parallel filaments 64 are spaced apart to provide between about 6 and about 14 filaments 64 per centimeter, such that the nylon net has between about 25 and about 200 openings 70 per square cm. The nylon net has a basis weight of about 10.8 grams per square meter, and a caliper of about 0.17 mm under a confining pressure of 0.1 psi. A suitable nylon net is commercially available as nylon tulle from fabric wholesalers and retailers. Such a nylon net is commercially available from Fabri-Centers of America of Hudson, Ohio under the designation SKU 040-1703.

FIGS. 1, 2 and 4 show a filamentary network 60 comprising a generally uniform rectangular grid of filaments. In other embodiments, the filamentary network 60 can comprise filaments arranged in a non-uniform manner.

TEST PROCEDURES

The following procedures are used to measure the tensile strength, flexural rigidity, and impact resistance of a sample of a base bib having a topsheet and backsheet. The same procedures are used to measured the comparable properties of a sample of a bib of the present invention having the same topsheet and backsheet construction as the base bib, but also incorporating a nylon net between the topsheet and backsheet. The topsheet comprises a Bounty brand paper towel, the backsheet comprises a polyethylene film having a thickness of about 0.025 mm. The filamentary network 60 comprises the nylon net described above available from Fabri-Centers of America as SKU 040-1703. In both the base bib and the bib having the nylon net according to the present invention, about 3 milligrams of the H2031 adhesive per square inch of bib area is used between the topsheet and the backsheet to join the bib components together. In the bib having the nylon net according to the present invention, the filaments 62 and 64 are oriented diagonally at about a 45 degree angle to the longitudinal axis 21, as shown in FIG. 2. Bib samples are conditioned at 50% RH and 73° F. for at least 2 hours before testing.

Tensile Test

The tensile strength of the bibs and of the filamentary network is measured with reference to the INDA standard test IST 110.1-92 of the Association of the Nonwoven Fabrics Industry, which standard is incorporated herein by reference. Bib samples are cut into 1.00 inch wide sample strips. The samples are placed squarely in the jaws of an Instron Model 4201 constant rate of elongation tensile tester. One inch, line-contact grips are used to avoid any sample slippage. The samples are pretensioned to zero load at a 1.0 inch gauge length. Force is measured with a 100 N load cell and recorded continuously as the sample is elongated at a crosshead speed of 12.0 inches per minute to complete failure. In all cases a local maxima occurs in the first inch of elongation. This initial peak is referred to as the tensile strength of the bib. This peak typically coincides with the failure of the topsheet or filamentary network, if present. In some cases, the load on the polyethylene film just before the polyethylene film breaks exceeds the initial peak. The strength values recorded are reported in grams per 1 inch wide strip (grams/inch). Properties are reported as an average of at least two measurements.

Results of tensile testing of the base bib and the bib having a nylon net oriented as shown in FIG. 2 are listed in Table 1. Properties are reported for samples cut from a bib such that the sample gauge length is generally perpendicular to the bib axis 21 (gauge length angled 45 degrees with respect to filaments in the bib having a nylon net), and also for samples cut to have a gauge length angled about 45 degrees with respect to with the bib axis 21 (gauge length aligned parallel and perpendicular to filaments in the bib having a nylon net).

The results in Table 1 show that the tensile strength of the laminate bib having a nylon net exceeds the tensile strength of the base bib. The laminate bib according to the present invention can have a tensile strength greater than about 2000 grams/inch, more particularly, greater than about 2500 grams/inch, and in the embodiment tested, greater than about 3000 grams/inch.

Impact Resistance Test (dropping projectile)

Impact resistance provides a measure of a bib's resistance to puncturing. Impact resistance of a bib sample is measured by dropping a projectile having a known weight from a known distance to impact upon a circular sample of the bib. A bib sample is positioned, then tightly clamped in an annular pneumatic grip having an internal diameter of 3.0 inches to form a 3 inch diameter bib sample supported at its edges by the pneumatic grip. A projectile having a specified mass and shape is allowed to fall freely onto the center of the 3.0 inch diameter bib sample from a height of 15.0 inches, where the 15.0 inch distance is measured from the sample surface to the center of mass of the projectile. The stainless steel projectile weighs 100 g, has a 19 mm diameter spherical end, and has a total length of 67 mm, with the center of mass of the projectile located about half way along its length, so that the rounded tip of the spherical end is about 348 mm from the surface of the sample. Five samples are impacted for the base bib construction and a bib according to the present invention. Each impacted sample is checked for puncture (any visible hole through the entire thickness of the bib.) A bib construction is considered to have an impact resistance equal to one half the mass of the projectile times the square of the velocity of the projectile as it impacts the sample if none of the five impacted samples is punctured by the projectile. When the base bib is tested with this impact test, each of the five base bib samples is punctured. When a bib having a nylon net according to the present invention is tested, none of the five samples is punctured. The velocity of the projectile is calculated using the equations of projectile motion for a drop distance of 15 inch and assuming no air resistance. For a 100 gram mass dropped 15 inches (38.1 cm), the impact resistance is reported as 1.86 million gram-centimeters squared/ second squared, or 186 gram-meters squared/second squared. Accordingly, the bib having a nylon net according to the present invention has an impact resistance of at least about 186 gram-meter squared /second squared.

FLEXURAL RIGIDITY (Inversely proportional to flexibility)

The relative flexibility of samples of a base bib and samples of a bib according to the present invention are measured using INDA standard test IST 90.1–92 as reference, which standard test is incorporated by reference. This test measures the flexural rigidity of a sample in terms of drape stiffness. A sample measuring 2.54 cm by 20 cm is cut from the bib and slid manually at a rate of about 4.75 in per minute in a direction parallel to its long dimension, so that its leading edge projects from the edge of a horizontal platform surface. The length of the overhang of the sample is measured when the tip of the sample is depressed under its own weight to the point where the line joining the tip of the sample to the edge of the platform makes a 41.5 degree angle with the horizontal. The flexural rigidity of the sample is the cube of this overhang length multiplied by the basis weight of sample. The flexural rigidity is reported in gram-centimeters as an average of at least two measurements. The flexibility of the sample is inversely proportional to the reported flexural rigidity. Results of flexural rigidity testing of the base bib and the bib having a nylon net oriented as shown in FIG. 2 are listed in Table 2. The flexural rigidity is reported for samples of the bib cut to have a long dimension generally perpendicular to the axis 21 of the bib (long axis angled 45 degrees with respect to filaments in the bib having a nylon net), and for samples of a bib cut to have a long dimension angled about 45 degrees with respect to the axis 21 (long axis parallel and perpendicular to filaments in the bib having a nylon net).

The results in Table 1 and Table 2 show that the laminate bib of the present invention can have a flexural rigidity which is only slightly greater than that of the base bib, while at the same time providing the above mentioned increase in tensile strength and puncture resistance. The laminate bib according to the present invention can have a flexural rigidity which is less than about 20 g-cm, more particularly, less than about 15 gram-cm, and in the embodiment tested less than about 12 gram-cm. Accordingly, the laminate bib according to the present invention has relatively tensile strength (for providing tear resistance) with a relatively low level of flexural rigidity (for providing softness and comfortable conformability of the bib to the wearer's body).

TABLE 1

| | Tensile Strength: | |
|---|---|---|
| | Gauge Length Perpendicular to Bib Axis 21 init peak load (gm/inch) | Gauge Length at 45 degree angle to Bib axis 21 init peak load (gm/inch) |
| Base Bib | 1690 | 1810 |
| | 1610 | 1700 |
| | 1490 | 1750 |
| | 1470 | 1800 |
| | 1380 | 1900 |
| avg | 1528 | 1792 |

TABLE 1-continued

| | Tensile Strength: | |
|---|---|---|
| | Gauge Length Perpendicular to Bib Axis 21 init peak load (gm/inch) | Gauge Length at 45 degree angle to Bib axis 21 init peak load (gm/inch) |
| Laminate Bib | (1) | (2) |
| With Nylon Net | 3000 | 3250 |
| | 3030 | 3310 |
| | 3300 | |
| | 3170 | |
| | 2950 | |
| avg | 3090 | 3280 |

(1) gauge length angled 45 degrees with respect to filaments in the laminate bib with nylon net
(2) gauge length parallel and perpendicular to filaments in the laminate bib with nylon net

TABLE 2

| | Flexural Rigidity: | | | | |
|---|---|---|---|---|---|
| | basis wt (mg/sq cm) | overhand length for sample length perpendicular to bib axis 21 (cm) | overhand length for sample length at 45 degrees to bib axis 21 (cm) | flexural rigidity for sample length perpendicular to bib axis 21 g-cm | flexural rigidity for sample length at 45 degrees to bib axis 21 g-cm |
| base bib | 7.1 | 10.8 | 11.0 | 8.94 | 9.45 |
| | 7.1 | 11.5 | 10.8 | 10.80 | 8.94 |
| | 7.1 | 11.3 | 11.0 | 10.24 | 9.45 |
| | 7.1 | 10.1 | 10.5 | 7.32 | 8.22 |
| | 7.1 | 11.7 | 10.6 | 11.37 | 8.46 |
| avg | | | | 9.73 | 8.90 |
| std dev | | | | 1.62 | 0.56 |
| Laminate Bib | | (1) | (2) | (1) | (2) |
| With Nylon Net | 8.7 | 10.3 | 10.4 | 9.51 | 9.79 |
| | 8.7 | 10.4 | 10.9 | 9.79 | 11.27 |
| | 8.7 | 11.0 | | 11.58 | |
| avg | | | | 10.29 | 10.53 |
| std dev | | | | 1.12 | 1.05 |

(1) Overhand length angled 45 degrees with respect to filaments in laminate big with nylon net.
(2) Overhang length parallel and perpendicular to filaments in laminate bib with nylon net.

While particular embodiments of the present invention have been illustrated and described, it would be obvious to those skilled in the art that various other changes and modifications can be made without departing from the spirit and scope of the invention. It is intended to cover in the appended claims all such changes and modifications that are within the scope of the invention.

What is claimed:

1. A disposable bib having a composite construction and comprising:

an absorbent, liquid permeable outer topsheet;

a garment facing backsheet layer, the backsheet layer being liquid impermeable relative to the topsheet; and a filamentary network disposed intermediate the backsheet and the topsheet.

2. The disposable bib of claim 1 wherein the filamentary network layer is joined to a surface of the topsheet.

3. The disposable bib of claim 2 wherein the filamentary network is joined to a surface of the backsheet.

4. The disposable bib of claim 1 wherein the filamentary network comprises a plurality of openings there through, and wherein the filamentary network has an open area ratio of at least about 50 percent.

5. The disposable bib of claim 1 wherein the filamentary network comprises a plurality of openings there through, and wherein the openings have a maximum width of no more than about 2 cm.

6. The disposable bib of claim 5 wherein the openings have a maximum width of no more than about 1.0 cm.

7. The disposable bib of claim 6 wherein the openings have a maximum width of no more than about 0.5 cm.

8. The disposable bib of claim 5 wherein the maximum cross-sectional dimension of the filaments is less than about 0.25 mm.

9. The disposable bib of claim 1 wherein the filamentary network comprises a polymeric material.

10. The disposable bib of claim 1 wherein the filamentary network comprises a web made from fibers selected from the group consisting of natural fibers, synthetic cellulosic fibers, synthetic modified cellulosic fibers, synthetic mineral fibers, and mixtures thereof.

11. The disposable bib of claim 1 wherein the filamentary network comprises a first plurality of generally parallel filaments extending in a first direction and a second plurality of generally parallel filaments extending in a second direction angled with respect to the first direction, wherein the maximum spacing between adjacent parallel filaments is no more than about 1 cm, and wherein the maximum cross-sectional dimension of the filaments is no more than about 0.25 mm.

12. The disposable bib of claim 1 wherein the topsheet comprises a paper web.

13. The disposable bib of claim 12 wherein the backsheet comprises a thermoplastic film.

14. A disposable bib having a composite construction and comprising:

an absorbent, liquid permeable topsheet layer having a first outwardly facing surface and a second oppositely facing surface; and a polymeric net comprising a first plurality of generally parallel filaments extending in a first direction and a second plurality of generally parallel filaments extending in a second direction angled with respect to the first direction, wherein the filaments are joined to the second surface of the topsheet layer, and wherein the maximum spacing between adjacent parallel filaments is no more than about 1 cm.

15. The disposable bib of claim 14 further comprising a backsheet layer which is liquid impermeable relative to the topsheet layer, and wherein the net is disposed intermediate the topsheet layer and the liquid impermeable backsheet layer.

16. The disposable bib of claim 14 wherein the maximum spacing between adjacent parallel filaments is no more than about 0.5 cm.

17. The disposable bib of claim 16 wherein the maximum spacing between adjacent parallel filaments is no more than about 0.25 cm.

* * * * *